Figure 5:
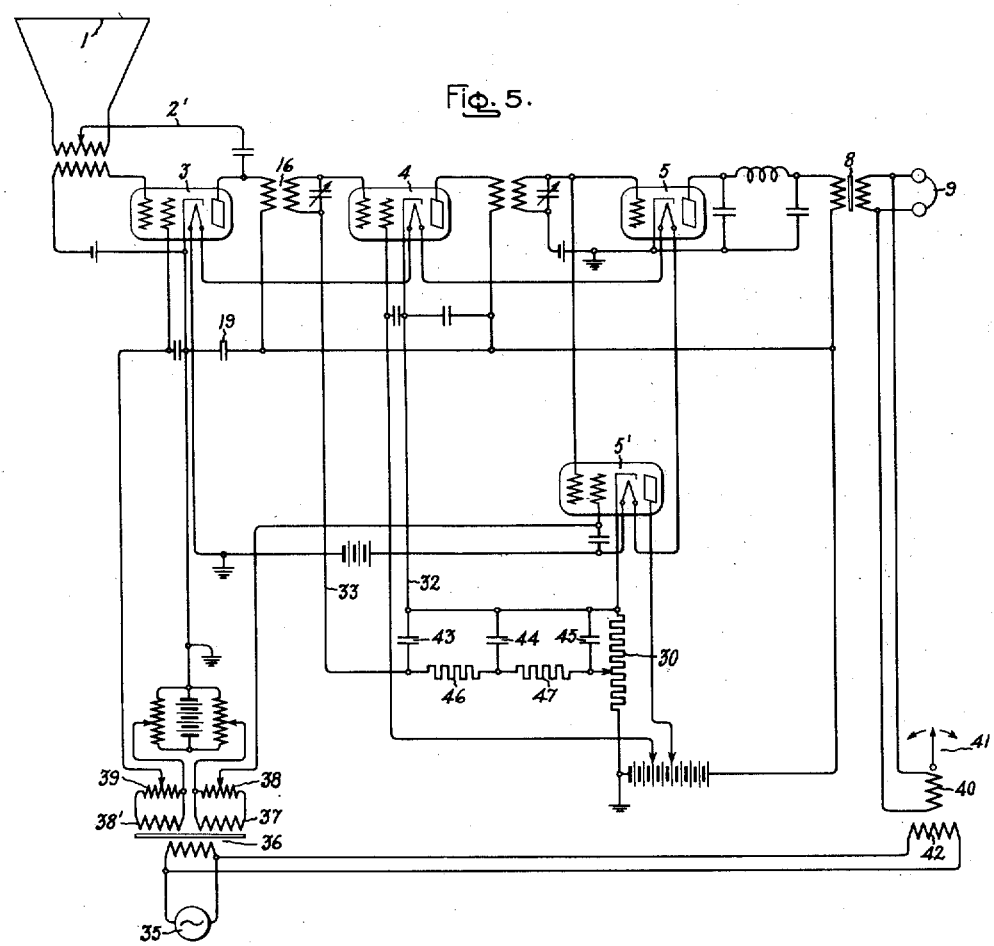

Feb. 19, 1935.   L. A. TAYLOR   1,992,019
RADIO RECEIVING APPARATUS
Filed Aug. 3, 1931   2 Sheets-Sheet 1
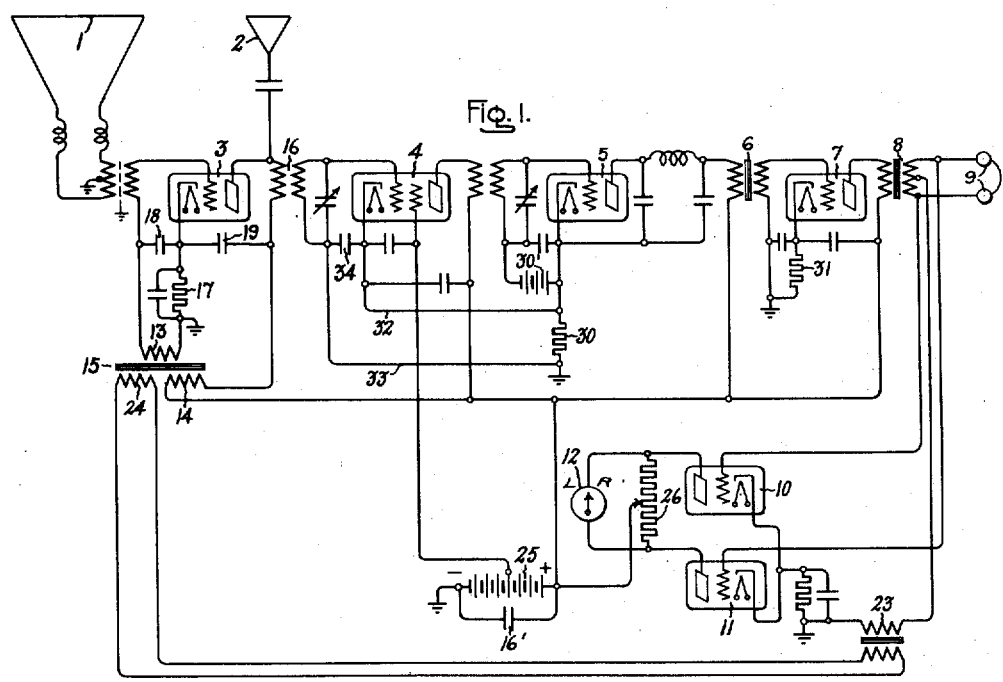
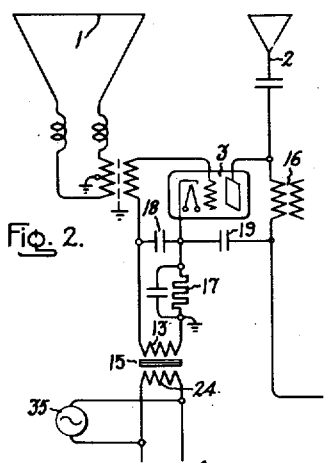
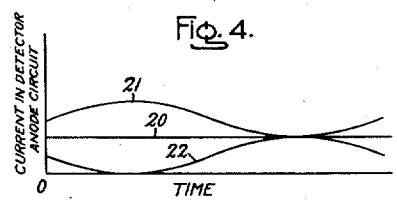
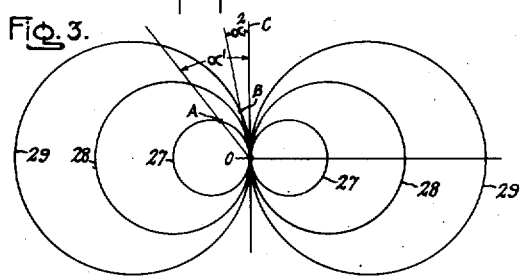
Inventor:
Laurens A. Taylor,
by Charles E. Tullar
His Attorney.

Patented Feb. 19, 1935

1,992,019

UNITED STATES PATENT OFFICE 1,992,019

RADIO RECEIVING APPARATUS

Laurens A. Taylor, Schenectady, N. Y., assignor to General Electric Company, a corporation of New York Application August 3, 1931, Serial No. 554,607

8 Claims. (Cl. 250—11)

My invention relates to radio receiving apparatus and more particularly to that class of apparatus which is used for determining the direction of propagation of the received oscillations.

My invention has for one of its objects to provide a directional receiving apparatus in which the sensitivity to direction is maintained substantially constant at different distances from the source of the received oscillations. Thus, for example, it is well known that as directional receiving equipment, as now employed, and which may include a directive antenna, such as a loop, is brought near to the source of received oscillations, the sensitivity of the indicating instrument to the position of the loop increases. That is, as the equipment is brought near to the source of received oscillations the index of the indicating instrument deflects through increasing angles in response to angular movement of the antenna. Accordingly, if the index is to be maintained in a position corresponding to a predetermined direction a closer adjustment of the position of the antenna is necessary at positions near the source of received waves than at points distant therefrom. When used on aircraft this characteristic of the equipment greatly increases the difficulty encountered in following a course leading toward the source of oscillations. If the loop be one which is mounted for movement only in accordance with the movement of the craft, the operator in attempting to follow a course leading toward the source of oscillations by the indications of the instrument receives the impression upon any deviation from the course that the angle of the deviation with respect to the course is greater than is actually the case with the result that he is led to over steer and continuously to zigzag back and forth across the course in an effort to keep the needle in the "on course" position. When at a distance from the source of oscillations, however, the sensitivity of the indicating device to the position of the loop is reduced with the result that the course is easier to follow. These difficulties are also encountered when the equipment is used to control the rudder of the craft, as through an automatic steering device. While automatic steering equipment will not be shown in the present application, it is obviously desirable that the response of such equipment to deviation from the course be constant throughout the length of the course. Thus, it is an object of my invention to provide a directional system in which the sensitivity of response is constant over large distances from the source of oscillations.

A further object of my invention is to provide convenient and economical means whereby the sensitivity to direction is maintained constant.

The novel features which I believe to be characteristic of my invention are set forth with particularity in the appended claims. My invention itself, however, both as to its organization and method of operation, together with further objects and advantages thereof, may best be understood with reference to the following description taken in connection with the accompanying drawings in which Figs. 1 and 5 represent different embodiments of my invention; Fig. 2 represents a modification of the arrangement shown in Fig. 1; and Figs. 3 and 4 represent certain characteristics relative to my invention.

Referring to Fig. 1 of the drawings, I have indicated therein a loop antenna 1 and a vertical antenna 2, these antennæ being shown in a conventional way to indicate any type of antennæ having respectively directive and non-directive properties with respect to the direction of propagation of the received wave. The directive antenna 1 is connected to supply oscillations to the input of an amplifier 3, the output of which is coupled in the circuit of the non-directive antenna 2. Thus oscillations from antenna 1 are amplified by the amplifier 3 and combined with those received from the antenna 2. The combined oscillations are supplied to the input circuit of an amplifier 4 whereby they are amplified by the device 4 and supplied to the input circuit of a detector 5. Coupled to the output circuit of the detector 5 by means of an audio frequency transformer 6 is an audio amplifier 7, the output of which is supplied through a transformer 8 to a pair of headphones 9 and through electron discharge devices 10 and 11 to direction indicating device 12.

Except in respects which will later be pointed out, the circuits of discharge devices 3, 4, 5, and 7 are of well known form and will not be described in detail, it being sufficient to point out that the anodes of these devices are all connected through the primary windings of the respective output transformers to the positive side of a source of potential 25 the negative terminal of which is connected to ground. The grids of devices 3, 4, and 7 are likewise connected through the secondary winding of the respective input transformers to ground and thence through biasing means 17, 30, and 31 respectively to the cathodes. The grid of detector 5 is provided with an individual source of bias potential 30'. The input circuits of devices 4 and 5 are, of course, tuned in the usual way whereas the input circuit to device 3 is aperiodic.

The electron discharge amplifier 3 in addition to serving as an amplifier of the radio frequency oscillations received from the directive antenna 1 also oscillates at a certain low frequency, as for example, 1000 cycles. Thus it will be observed that the grid and anode circuit of this device are coupled together by windings 13 and 14 on an audio transformer 15. The winding 13 is connected between the grid and cathode and the winding 14 is connected between the anode and cathode, this latter circuit extending from the anode through the primary winding of radio frequency transformer 16, winding 14, condenser 16' to ground and thence from ground through a parallel combination of resistance and capacitance 17 to the cathode of the discharge device. The resistance and capacitance of this parallel combination 17 are so proportioned as to provide a suitable bias on the grid of the amplifier 3 during operation thereof. This combination and the winding 13 in series therewith, are bypassed with respect to radio frequency oscillations by means of a condenser 18 and similarly that portion of the anode circuit on the cathode side of the primary winding of transformer 16 is bypassed with respect to radio frequency oscillations by means of condenser 19. The frequency of the low frequency oscillations is determined by the constants of the transformer 15 and condensers 18 and 19, and preferably is in the neighborhood of 1000 cycles.

During operation of the device 3 to produce low frequency oscillations its amplification with respect to the radio frequency oscillations received from loop 1 varies in a sinusoidal manner. Thus, for example, by proper adjustment of the circuits, at a point in the half cycle of the low frequency oscillations when a maximum of negative potential is impressed upon the grid, the device may be inoperative to amplify oscillations received from the loop 1 whereas its amplification of these oscillations increases to a maximum value during the successive half cycle of the low frequency oscillations. In this way the tube 3 acts as a modulating device to modulate the oscillations received from the loop 1 with the oscillations generated within the tube itself and to supply the modulated oscillations to the input circuit of the amplifier 4 where they are combined with the oscillations received from the nondirective antenna 2.

The oscillations received from the antennæ 1 and 2 combine in the input circuit of the amplifier 4 either in aiding or opposed relation depending upon the position of the loop 1 and thereby cause the oscillations which are amplified by the device 4 and detected by the device 5 to vary in a sinusoidal way, the sinusoidal variation having a time phase relation dependent upon the position of the loop 1. Thus in the output circuit of the detector the low frequency oscillations produced by the device 3 are reproduced and have a time phase relation dependent upon the loop 1.

This operation of the device may best be understood by reference to Fig. 4 in which I have plotted current in the detector anode circuit as ordinates against time as abscissa. Thus, if we assume that oscillations received from the antenna 2, which are of uniform intensity with respect to the direction of propagation of the received waves, cause a current to flow in the detector anode circuit having a value corresponding to the curve 20 of the Fig. 4 then the oscillations received from the loop 1 through amplifier 3, upon being combined in aiding or opposed relation with the oscillations received from the antenna 2, cause the detector current to vary in a sinusoidal way as indicated by the curves 21 and 22. If the loop 1 is in such a position that the two oscillations combine in phase then the oscillations impressed upon the input circuit of the amplifier 4 and the detector 5 are maximum during that portion of the half cycle when the device 3 has maximum amplification, and accordingly, the current in the detector 5 will be increased in accordance with the curve 21. If, however, the loop 1 be in such a position that the two waves combine in opposed relation then the oscillations impressed upon the circuits of amplifier 4 and detector 5 are a minimum during those portions of the half cycle when the amplification of amplifier 3 is maximum. Thus the current in the detector circuit will be reduced in a sinusoidal way as indicated by the curve 22. It will be observed that the curves 21 and 22 are 180° displaced in phase and that this displacement in phase is produced by movement of the antenna 1 between two positions. When the loop is in a position intermediate these two positions and corresponding to a direction at right angles to the direction of the received waves no oscillations are received in the loop. Movement of the loop either to the right or to the left from this intermediate position, however, causes a certain amount of energy to be received in the loop, these oscillations having a certain time phase relation when the loop is moved in one direction from the intermediate position and a reversed time phase relation when the loop is moved in the opposite direction. Thus an alternating current is produced in the output circuit of the detector the phase relation of which may be reversed by the movement of the antenna in one direction or the other with respect to the direction of propagation of the received wave. This alternating current wave is amplified by the device 7 and supplied through transformer 8 to the grids of discharge devices 10 and 11 in opposite phase relation, these grids being connected to the opposite terminals of a secondary winding of the transformer 8.

The discharge devices 10 and 11 together with resistance 26 and instrument 12 act as a phase indicating device to indicate the phase relation between the low frequency oscillations reproduced by detector 5 and those originally produced by the device 3. The low frequency oscillations produced by device 3 are supplied from winding 24 on transformer 15 to transformer 23, the secondary winding of which is connected between the cathodes of devices 10 and 11 and the midpoint on the secondary winding of transformer 8. Thus these oscillations are impressed upon the grids in phase rather than in opposed phase relation as are those received from the transformer 8. Accordingly, the oscillations received from the transformer 23 and those received from the transformer 8 are applied to the grids of each of the discharge devices 10 and 11 either in opposed or aiding relation dependent upon the position of the antenna 1. The anodes of the two discharge devices are connected together through the resistance 26 and are energized by means of a source of potential 25 connected between ground and the midpoint of this resistance. The course indicating instrument is connected between opposite points on this resistance.

As thus arranged, if we assume that the antenna 1 is in a certain position, such that the two oscillations supplied to the discharge device 11 are in phase, then a decrease in current in the anode circuit of the discharge device 11 occurs; and simultaneously an increase in the anode current of the device 10 takes place since the two oscillations supplied to the grid of that device are in opposed phase relation. Accordingly, a reduction in current in the lower part of resistance 26 and an increase in current in the upper part of resistance 26 takes place with the result that current flows through the indicating device 12 in a direction to cause the index thereof to deflect, for example, toward the right. If we now move the loop 1 to a position such that the two oscillations impressed on the devices 10 and 11 combine in aiding relation on the grid of device 10 and in opposed relation on the grid of device 11, then an increase of current takes place in the lower portion of resistance 26 and a diminution of current occurs in the upper portion thereof. The current in the indicating device 12 then reverses causing the index to deflect to the left.

It will thus be observed that if the equipment be arranged upon an aircraft, for example, and the loop 1 arranged for movement with the craft then a course in the direction of propagation of the received waves may be followed by so guiding the craft as to maintain the index of the indicating device 12 in a central position. If the craft turns to the right or to the left from the course the needle of device 12 deflects in the corresponding direction thereby informing the pilot that he is off course.

It is desirable, however, that the sensitivity of the indicating device 12 to the position of the loop 1 and hence to the movement of the craft be substantially constant as the craft approaches the source of the received oscillations. If the sensitivity of the indicating device 12 increases as the craft approaches the source, then the difficulties previously pointed out in following the course are encountered. This effect may better be understood by reference to Fig. 3 in which the different figure 8 patterns 27, 28, and 29 represent the patterns of an ordinary loop when rotated about a vertical axis corresponding to the point common to all of the different patterns. Thus, for example, if the loop is at a great distance from the source of oscillations and occupies the position in which the index of the indicating instrument is at the central point of its scale and is then rotated through 180°, the deflection of the index will vary in accordance with the right hand lobe 27, the index returning to the center of the scale when the loop is returned to its initial plane. If the rotation now be continued through a successive 180° thereby returning the loop to its initial position then the index deflects in the opposite direction in accordance with the left hand lobe 27. The same operation occurs when the loop is brought nearer to the source of oscillations but the deflection of the instrument is greater as is indicated by the lobes 28 and 29 of larger radii.

It will be observed that if points of equal distance from the origin O and corresponding to equal deflections from the origin be marked off on the different lobes as, for example, points A and B, and that lines OA and OB be drawn through the origin and these points, these lines make different angles $\alpha_1$ and $\alpha_2$ respectively with a line OC corresponding to the true course when the index of the instrument occupies the "on course" position. Accordingly, if the craft is at a distance from the source such that a deflection of the instrument corresponding to the value OA indicates a deviation from the course by an angle $\alpha_1$ and then proceeds to a position such that an equal deflection of the instrument is produced in response to deviation from the course by a much smaller angle $\alpha_2$, the pilot is likely to be misled by the latter indication with the result that he repeatedly oversteers and finds difficulty in following the course. The deflection of the instrument therefore is not a satisfactory indication of the angle between the loop and the course.

To overcome this effect means are provided in accordance with my invention for controlling the amplification of the amplifier 4 in accordance with the intensity of oscillations received by the vertical antenna 2. This means comprises a resistance 30 connected in the anode circuit of the detector 5 between ground and the cathode. The potential on this resistance is supplied between the cathode and grid of the discharge device 4 through conductors 32 and 33. Thus, as the craft approaches the source of oscillations, the current in the anode circuit of the detector increases thereby causing the grid of amplifier 4 to become more negative with respect to the cathode, this effect in turn reducing the amplification of the discharge device 4. In this way the amplification of the device 4 is so controlled that the intensity of the low frequency oscillation which is reproduced in the anode circuit of the device 5 is maintained substantially constant irrespective of the intensity of the oscillations received from antenna 2.

It will be observed that a condenser 34 is connected in parallel with the resistance 30 and that an additional condenser 16' is connected in parallel with the source of anode potential 25. The capacitance of these condensers is so chosen that the time constant of the automatic sensitvity control means is such that it does not respond to variations in intensity of oscillations supplied thereto which occur due to variation in the amplification of amplifier 3 whereby the amplification of device 4 is controlled only in accordance with the gradual variations which take place as during movement of the equipment toward or away from the source of oscillations. Thus the amplification is controlled substantially in accordance with the intensity of oscillations received from the antenna 2 and independently of the intensity of oscillation received through the amplifier 3.

It will thus be observed that with the equipment as thus described adjusted to operate, for example, in accordance with the curve 27 of Fig. 3, its operation will be in accordance with this curve 27 throughout the entire course of the craft toward, or away from, the source of oscillations and accordingly the sensitvity of the indicating device to the position of the loop remains constant. It will be observed further that this effect is one which is not due entirely to the sensitivity control means 30, 32, 33 but instead results from the combination with the directive and non-directive antennæ 1 and 2 as indicated.

In Fig. 2 I have shown a modification of the arrangement shown in Fig. 1 in which the locally produced oscillations are supplied from an independent source 35 through the transformer 15 to the grid of amplifier 3 thereby sinusoidally to vary the amplification of that device. Thus in accordance with this modification of the invention the coupling between the anode circuit and grid circuit which is produced by the winding 14 of Fig. 1 is eliminated. Oscillations from an independent source 35 in this figure are also supplied to the transformer 23 as shown in Fig. 1.

In Fig. 5 I have shown a further embodiment of my invention which differs from that shown in Fig. 1 in respects which will be presently explained. In the arrangement of this figure the loop 1, in addition to serving as a directive antenna also serves as a non-directive antenna, the non-directive antenna circuit including the loop 1, conductor 2', primary winding of transformer 16, and condenser 19 to ground.

The amplifier 3 in this figure comprises a discharge device of the screen grid type and its amplification is sinusoidally varied by means of low frequency oscillations supplied to the screen grid thereof from the secondary winding 37 on a transformer 36 the primary winding of which is connected to the local source of oscillation 35.

The course indicating instrument in this figure comprises a simple two-winding indicating device 41 of the wattmeter type, one of the windings 40 of this instrument being supplied with low frequency oscillations which are reproduced by the detector 5 and the other winding 42 being supplied with oscillations directly from the source 35. Thus the index of this instrument moves either to the right or to the left dependent upon whether the currents in the two windings are in phase or in opposed phase relation.

In the arrangement of this figure the detector 5 serves only to demodulate the high frequency wave, the automatic sensitivity control being effected by means of an additional detector 5' the control grid of which is connected in parallel with the detector 5. The automatic sensitivity control resistance 30 is connected in series with the anode circuit of this device the potential on a portion of this resistance being supplied between the grid and cathode of the amplifier 4 through conductors 32 and 33. Connected between the conductors 32 and 33 are a plurality of condensers 43, 44, and 45 between adjacent condensers of which are connected resistances 46 and 47. This condenser resistance combination constitutes a network the time constant of which is such that the potential supplied to the grid of the discharge device varies only in accordance with the gradual variations in potential on resistance 30 which occur as the result of variations in intensity of oscillations in the non-directive antenna circuit and is substantially unaffected by intensity variations produced by the device 3.

It may occur, however, that the bias potential upon the grid of device 3 will vary to a certain extent at the low frequency rate notwithstanding the use of the network 43—47. To overcome this effect means are provided whereby current in the anode circuit of detector 5' is controlled synchronously with the modulation which is effected by the amplifier 3. This control is effected by means of a screen grid within the discharge device 5' and which similarly with device 3 is supplied with potential from the source 35 through the transformer 36. Thus a second secondary winding 37 on transformer 36 is connected between the screen grid and cathode of the device 5'. The intensity of the oscillations supplied to the screen grids of the amplifier 3 and detector 5' may be controlled by potentiometers 38 and 39 connected respectively across the windings 37 and 38'. By proper adjustment of the potentiometer 38 any residuum of variation in potential between conductors 32 and 33 at the frequency of the source 35 may be eliminated thereby producing a steady bias potential upon the grid of device 4 the intensity of which varies only in accordance with the variations in intensity of oscillations produced in the non-directive antenna circuit.

While I have shown particular embodiments of my invention, it will of course be understood that I do not wish to be limited thereto since many modifications both in the circuit arrangement and in the instruments employed may be made, and I contemplate by the appended claims to cover any such modifications as fall within the true spirit and scope of my invention.

What I claim as new and desire to secure by Letters Patent of the United States, is:

1. In combination, a directive antenna circuit, a non-directive antenna circuit, a source of low frequency oscillations, means for modulating high frequency oscillations received from said directive antenna circuit with said low frequency oscillations and for combining said modulated oscillations with oscillations received from said non-directive antenna circuit, an indicating device, means for reproducing said low frequency oscillations from said high frequency oscillations and for supplying said low frequency oscillations to said indicating device, means for supplying low frequency oscillations directly from said source to said indicating device and means for maintaining the relative intensity between said oscillations supplied to said indicating device substantially constant irrespective of variations in intensity of oscillations received from said non-directive antenna circuit.

2. In combination, a directive antenna circuit, a non-directive antenna circuit, a source of low frequency oscillations, means for modulating high frequency oscillations received from said directive antenna circuit with said low frequency oscillations and for combining said modulated oscillations with oscillations received from said non-directive antenna circuit, means to amplify said combined oscillations, means to reproduce said low frequency oscillations from said combined oscillations, indicating means responsive to the phase relation between said reproduced oscillations and the low frequency oscillations of said source and means for automatically controlling the amplification of said amplifying means in accordance with the intensity of oscillations received from said non-directive antenna circuit and irrespective of the intensity of oscillations received from said directive antenna circuit.

3. In combination, an antenna, means to modulate oscillations received from said antenna with local oscillations, means to amplify the modulated oscillations, and means controlled by said local oscillations for automatically governing the amplification of said amplifying means.

4. In combination, a directive antenna circuit, a non-directive antenna circuit, means to modulate oscillations received from said directive antenna with local oscillations, means for combining said modulated oscillations with oscillations received from said non-directive antenna circuit and amplifying the combined oscillations, means responsive to the intensity of the amplified oscillations and to said local oscillations for controlling the amplification of said amplifying means and means to demodulate said local oscillations, whereby said local oscillations are reproduced with substantially constant intensity irrespective of variations in intensity of oscillations received from either of said antennæ circuits.

5. In combination, an antenna, an amplifier for amplifying oscillations received from said antenna, means for modulating said oscillations prior to amplification by said amplifier, means responsive to the intensity of said oscillations for controlling the amplification of said amplifier, and means for controlling said last means synchronously with the modulation produced by said modulating means whereby said means is responsive only to gradual variations in the intensity of said oscillations and is unresponsive to said modulation.

6. In combination, an amplifier, a directive antenna, a non-directive antenna, means for supplying oscillations received from both of said antennæ to said amplifier for amplification thereby, a detector connected to the output of said amplifier, means responsive to direct current flowing in said detector to control the amplification of said amplifier, a local source of oscillations, means for modulating the oscillations received from said directive antenna prior to said amplification in accordance with said oscillations from said local source and for synchronously controlling said detector, whereby the amplification of said amplifier is varied only in accordance with gradual variations in the intensity of said received oscillations, and means responsive to the time-phase relation of the modulation of said amplified oscillations to indicate the position of said non-directive antenna with respect to the direction of propagation of received waves whereby said means is substantially equally sensitive to the position of said antenna at different distances from the source of the received oscillations.

7. In combination, an amplifier, means for supplying high frequency oscillations modulated at a low frequency to said amplifier, means for controlling the amplification of said amplifier in response to gradual variations in intensity of said high frequency oscillations and means synchronous with the low frequency modulation of said oscillations to neutralize the effect of said last means in reducing said low frequency modulation.

8. In combination, an electron discharge amplifier having a grid, means for supplying high frequency oscillations modulated at low frequency to said amplifier, an electron discharge detector connected to receive oscillations from said amplifier, said detector also having a grid, means responsive to direct current in said detector to supply bias potential to the grid of said amplifier thereby to control the amplification thereof, and means for supplying low frequency electromotive force synchronous with the modulation of said high frequency oscillations to the grid of said detector thereby to neutralize the effect of said detector in reducing said low frequency modulation.

LAURENS A. TAYLOR.